(12) United States Patent
Wu

(10) Patent No.: US 9,022,711 B2
(45) Date of Patent: May 5, 2015

(54) VIBRATION-ISOLATING SCREW

(75) Inventor: Jing-Tang Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 159 days.

(21) Appl. No.: 13/463,196

(22) Filed: May 3, 2012

(65) Prior Publication Data

US 2013/0034406 A1 Feb. 7, 2013

(30) Foreign Application Priority Data

Aug. 4, 2011 (TW) .............................. 100127777 A

(51) Int. Cl.
*F16B 35/06* (2006.01)
*F16B 5/02* (2006.01)

(52) U.S. Cl.
CPC ............... *F16B 5/0241* (2013.01); *F16B 35/06* (2013.01)

(58) Field of Classification Search
CPC .......... F16F 15/03; F16B 35/03; F16B 35/06; F16B 45/00; F16B 5/0242; F16B 35/0241
USPC ....................... 411/400, 41, 410; 267/140.14; 403/220–228, DIG. 1; 248/562, 566, 248/580; 188/321.11
See application file for complete search history.

(56) References Cited

U.S. PATENT DOCUMENTS

| | | | | |
|---|---|---|---|---|
| 4,020,929 A | * | 5/1977 | Goldin | 188/321.11 |
| 4,314,623 A | * | 2/1982 | Kurokawa | 188/267 |
| 4,432,441 A | * | 2/1984 | Kurokawa | 188/267 |
| 4,759,534 A | * | 7/1988 | Hartel | 267/140.14 |
| 5,275,388 A | * | 1/1994 | Kobayashi et al. | 267/140.14 |
| 5,291,967 A | * | 3/1994 | Aoki | 180/312 |
| 5,641,152 A | * | 6/1997 | Angles et al. | 267/220 |
| 5,726,512 A | * | 3/1998 | Chu et al. | 310/90.5 |
| 6,129,185 A | * | 10/2000 | Osterberg et al. | 188/267.2 |
| 6,260,835 B1 | * | 7/2001 | Angles et al. | 267/220 |

(Continued)

FOREIGN PATENT DOCUMENTS

| | | |
|---|---|---|
| CN | 1399203 A | 2/2003 |
| CN | 201436420 U | 4/2010 |

(Continued)

OTHER PUBLICATIONS

Taiwan Office Action for Taiwan Application No. 100127777 dated Jul. 8, 2013 with partial English translation.

(Continued)

*Primary Examiner* — Flemming Saether
(74) *Attorney, Agent, or Firm* — Muncy, Geissler, Olds & Lowe, P.C.

(57) ABSTRACT

A vibration-isolating screw is disclosed. The vibration-isolating screw includes a screw head and a screw tail portion. The screw head includes a first screw body, a first magnetic element, a second screw body, a second magnetic element, a third screw body and a third magnetic element. The first magnetic element and the second magnetic element are mounted on the first screw body and the second screw body, respectively. The third screw body is mounted between the first screw body and the second screw body. The third magnetic element comprises a first end and a second end and is mounted on the third screw body. The first end and the first magnetic element are adjacent and mutual repulsion. The second end and the second magnetic element are adjacent and mutual repulsion. The screw tail portion is connected with the second screw body.

12 Claims, 6 Drawing Sheets

(56) References Cited

U.S. PATENT DOCUMENTS

| | | | |
|---|---|---|---|
| 6,405,841 B1 * | 6/2002 | Zeno | 188/267 |
| 6,644,886 B2 | 11/2003 | Schwarz | |
| 6,827,184 B1 * | 12/2004 | Lin | 188/321.11 |
| 6,917,520 B2 | 7/2005 | Lin et al. | |
| 2005/0109570 A1 * | 5/2005 | Muller et al. | 188/321.11 |
| 2006/0202100 A1 | 9/2006 | Cheng | |
| 2008/0227379 A1 * | 9/2008 | Hung | 454/184 |
| 2009/0226663 A1 | 9/2009 | Hutter, III | |

FOREIGN PATENT DOCUMENTS

| | | | |
|---|---|---|---|
| CN | 201526573 U | | 7/2010 |
| GB | 559134 | * | 2/1944 |

OTHER PUBLICATIONS

Chinese Office Action for Chinese Application No. 20110235629.0 dated Jan. 30, 2014 with partial English translation.

* cited by examiner

VIBRATION-ISOLATING SCREW

BACKGROUND OF THE INVENTION

1. Field of the Invention

The present invention relates to a screw, and more particularly, to a vibration-isolating screw which can reduce the effect of vibrations.

2. Description of the Related Art

In recent years, there's been widespread adoption of electronic devices such as personal computer or notebook PC. These electronic devices usually come with speakers or other multimedia equipment disposed therein. However, when a speaker is disposed in the notebook PC and is making sound, the vibration of the speaker could be easily transmitted via a main structure to adjacent components to cause other components to resonate, resulting in malfunction or operation error.

Hence, it is common to add an anti-vibration pad to a fixing hole of the speaker to absorb most of the vibrations generated by the speaker during operation, as the speaker is still attached to the main structure in this configuration. Although the anti-vibration pad disposed between the speaker and the main structure can absorb some of the vibrations, it cannot solve the problem caused by vibration completely. Still some of the vibrations are transmitted via the main structure to other components.

Therefore, it is necessary to provide a vibration-isolating screw which can completely isolate a vibrating source and the main structure to solve the vibrating problems seen in the prior art.

SUMMARY OF THE INVENTION

It is an object of the present invention to provide a vibration-isolating screw which can fix the vibrating element on the main structure and reduce the vibration effect on the main structure caused by the vibrating element.

In order to achieve the above object, in an embodiment of the present invention, the vibration-isolating screw comprises a screw head and a screw tail portion. The screw head comprises a first screw body; a first magnetic element, a second screw body, a second magnetic element, a third screw body, and a third magnetic element. The first magnetic element is mounted on the first screw body; the second magnetic element is mounted on the second screw body. The third screw body is mounted between the first screw body and used for being connected with the vibrating element. The third magnetic element is mounted on the third screw body, wherein the third magnetic element comprises a first end and a second end, the first end and the first magnetic element are adjacent and mutual repulsion, the second end and the second magnetic element are adjacent and mutual repulsion. The screw tail portion is connected with the second screw body and used for fixing the vibrating element on the main structure.

In an embodiment of the present invention, the third screw body comprises a slot for allowing the third screw body to be connected with the vibrating element.

In an embodiment of the present invention, the first screw body further comprises at least one hook, the second screw body further comprises at least one fixing hole, and the third screw body further comprises at least one through hole; the at least one hook is inserted through the at least one through hole and the at least one fixing hole to connect the first screw body, the second screw body and the third screw body.

In an embodiment of the present invention, each hook comprises a slender portion and a hook portion, the slender portion has a length longer than a thickness of the third screw body.

In an embodiment of the present invention, a first gap is formed between the first screw body and the third screw body and a second gap is formed between the second screw body and the third screw body.

In an embodiment of the present invention, the screw tail portion comprises a thread.

In an embodiment of the present invention, the first magnetic element is mounted on the first screw body by gluing method and the second magnetic element is mounted on the second screw body by gluing method.

In an embodiment of the present invention, the first screw body, the second screw body and the third screw body are formed in a disk shape separately.

In an embodiment of the present invention, the slot is a circular slot.

In an embodiment of the present invention, the third magnetic element comprises an upper magnetic element and a lower magnetic element, the upper magnetic element is mounted in the third screw body adjacent to a side of the first screw body, and the lower magnetic element is mounted in the third screw body adjacent to a side of the second screw body.

In an embodiment of the present invention, the first screw body further comprises a plurality of hooks, the second screw body further comprises a plurality of fixing holes, and the third screw body further comprises a plurality of through holes; the plurality of hooks are inserted through the plurality of through holes and the plurality of fixing holes to connect the first screw body, the second screw body, and the third screw body.

In an embodiment of the present invention, the first screw body further comprises four hooks, the second screw body further comprises four fixing holes, and the third screw body further comprises four through holes; the four hooks are inserted through the four through holes and the four fixing holes to connect the first screw body, the second screw body, and the third screw body.

DETAILED DESCRIPTION OF THE PREFERRED EMBODIMENT

The advantages and innovative features of the invention will become more apparent from the following detailed description when taken in conjunction with the accompanying drawings.

Figure 1:
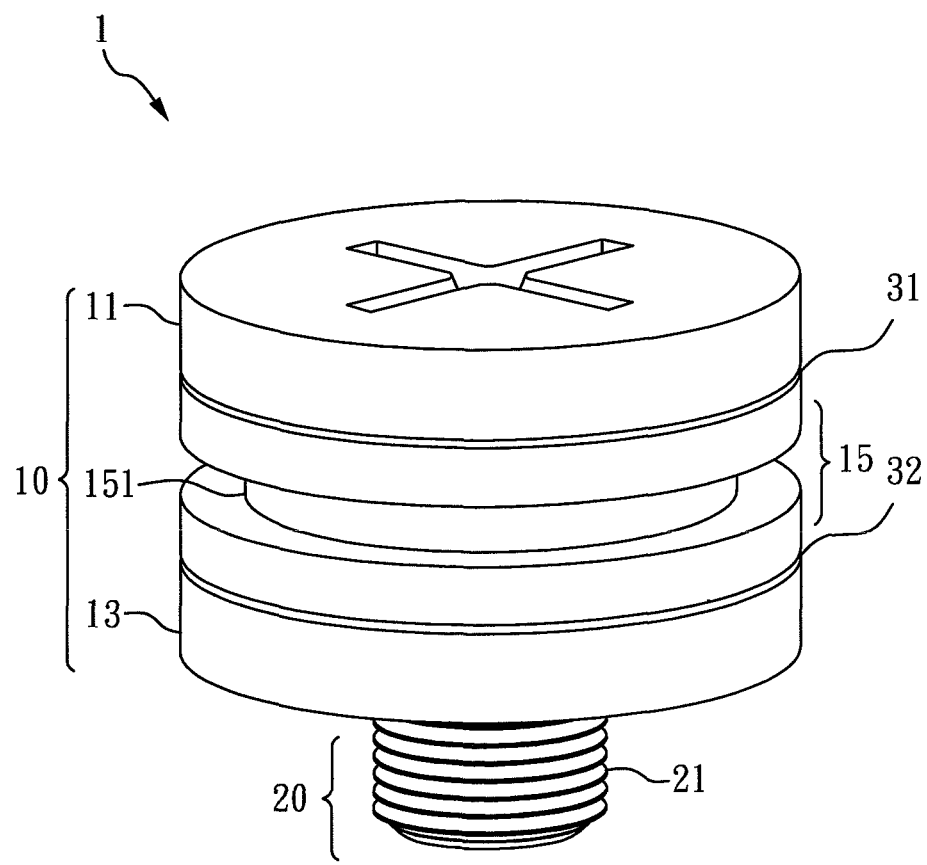
FIG. 1 illustrates an exterior view of a vibration-isolating screw of the present invention.
Figure 2:
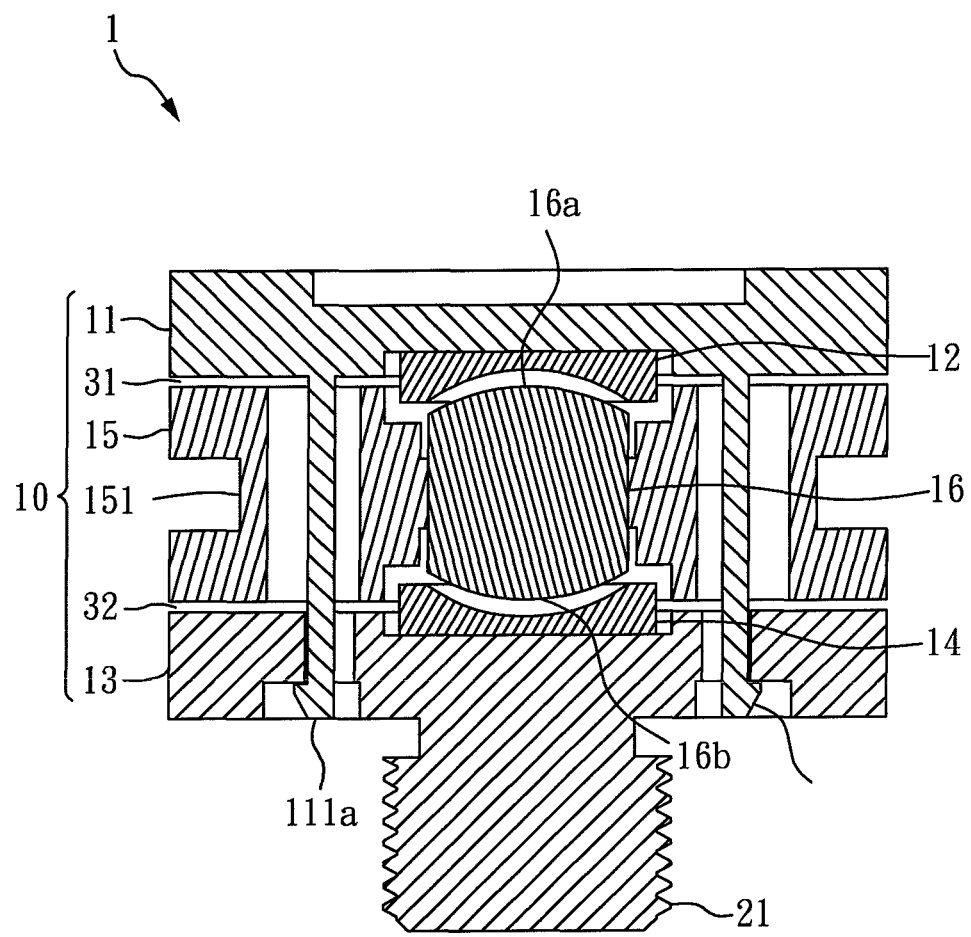
FIG. 2 illustrates a sectional view of a first embodiment of the vibration-isolating screw of the present invention.
Figure 3:
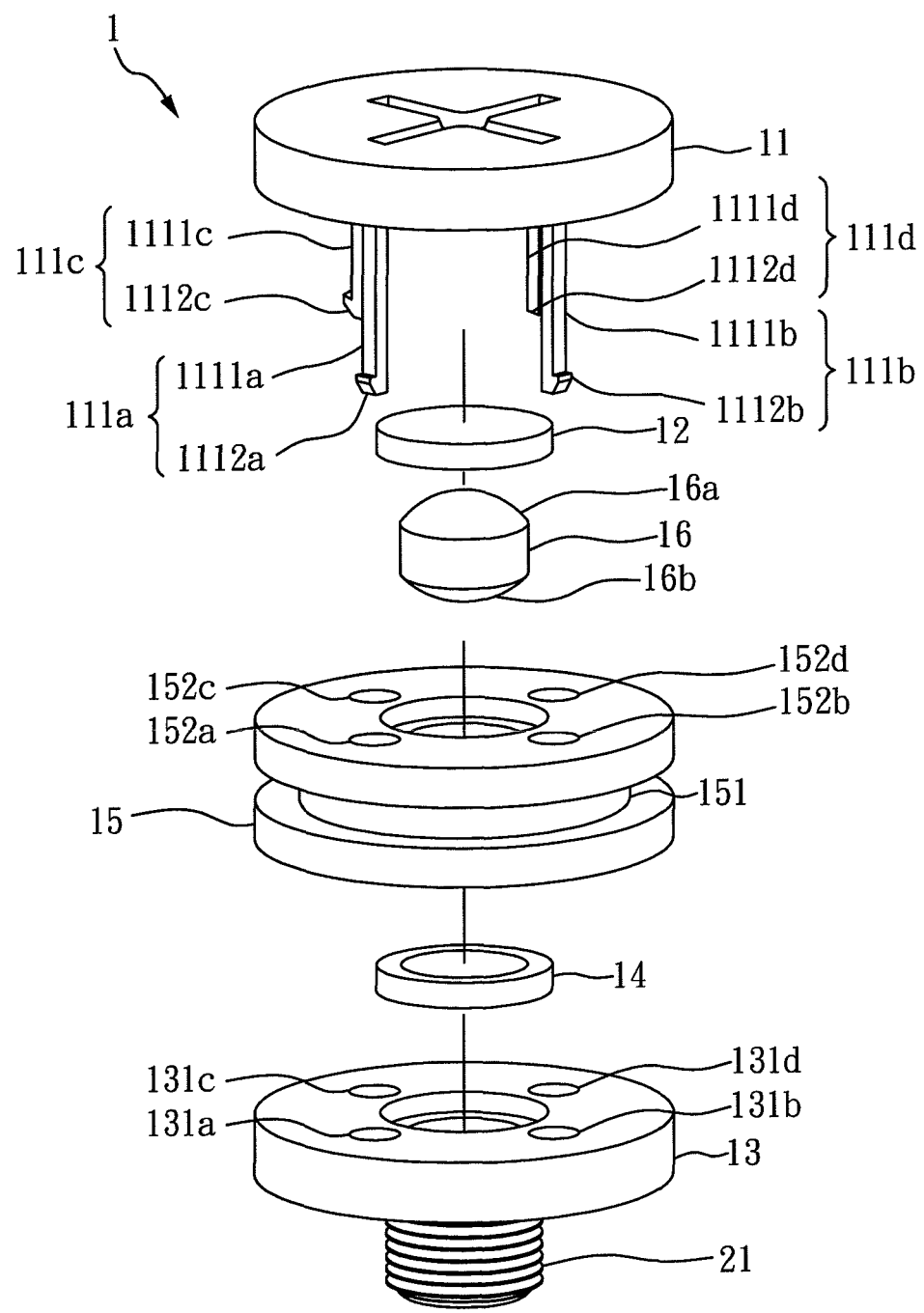
FIG. 3 illustrates an explosive view of the first embodiment of the vibration-isolating screw of the present invention.

Please refer to FIG. 1 to FIG. 3 for a vibration-isolating screw of a first embodiment of the present invention. In this embodiment, the vibration-isolating screw 1 comprises a screw head 10 and a screw tail portion 20. The screw head 10 comprises a first screw body 11, a first magnetic element 12, a second screw body 13, a second magnetic element 14, a third screw body 15, and a third magnetic element 16. The screw tail portion 20 comprises a thread 21.

In this embodiment, the first screw body 11, the second screw body 13, and the third screw body 15 can be in a disk shape or any other shape, such as a rectangular shape. The first screw body 11, the second screw body 13, and the third screw body 15 are basically made of metallic materials or any other materials, such as plastic materials.

In this embodiment, the first magnetic element 12 is disposed underneath the first screw body 11, and the second magnetic element 14 is mounted on the second screw body 13. The third screw body 15 is mounted between the first screw body 11 and the second screw body 13, and the third magnetic element 16 is disposed in the third screw body 15. The first magnetic element 12 and the second magnetic element 14 can be glued to be mounted on the first screw body 11 and the second screw body 13 respectively, or the first magnetic element 12 and the second magnetic element 14 can be embedded/bound to the first screw body 11 and the second screw body 13 by any other means respectively. The third screw body 15 contains a space for disposing the third magnetic element 16.

The third magnetic element 16 comprises a first end 16a and a second end 16b, wherein the first end 16a and the first magnetic element 12 are adjacent and mutual repulsion. The second end 16b and the second magnetic element 14 are adjacent and mutual repulsion. Since the first magnetic element 12 and the third magnetic element 16 are mutual repulsion, the second magnetic element 14 and the third magnetic element 16 are mutual repulsion as well; therefore, a first gap 31 is formed between the first screw body 11 and the third screw body 15, and a second gap 32 is formed between the second screw body 13 and the third screw body 15.

In this embodiment, the first screw body 11 comprises four hooks 111a, 111b, 111c, and 111d, the second screw body 13 comprises four corresponding fixing holes 131a, 131b, 131c, and 131d, the third screw body 15 comprises four corresponding through holes 152a, 152b, 152c, and 152d. Each hook (111a, 111b, 111c, and 111d) comprises a slender portion (1111a, 1111b, 1111c, 1111d) and a hook portion (1112a, 1112b, 1112c, 1112d), and the slender portion (1111a, 1111b, 1111c, 1111d) has a length longer than a thickness of the third screw body 15. The hooks 111a, 111b, 111c, and 111d are inserted through the through holes 152a, 152b, 152c, and 152d and the fixing holes 131a, 131b, 131c, and 131d to connect the first screw body 11, second screw body 13 and the third screw body 15. The hooks 111a, 111b, 111c, and 111d of the first screw body 11 can be made of metallic materials or any other materials, such as plastic materials. The through holes of the third screw body 15 and the fixing holes of the second screw body 13 are formed in a circular shape or any other shape, such as a rectangular shape. It is noted that the number of the hooks is not limited to four, and so are the number of the fixing holes and the number of the through holes, as long as the hooks, the fixing holes, and the through holes can be used to fix the screw bodies. The third screw body 15 further comprises a slot 151, which can be formed in a circular shape or any other shape, such as a rectangular shape.

In this embodiment, the screw tail portion 20 is connected with the second screw body 13. The screw tail portion 20 is basically consisted of thread 21; however, the screw tail portion 20 can comprise a hook or other structures.

Figure 4:
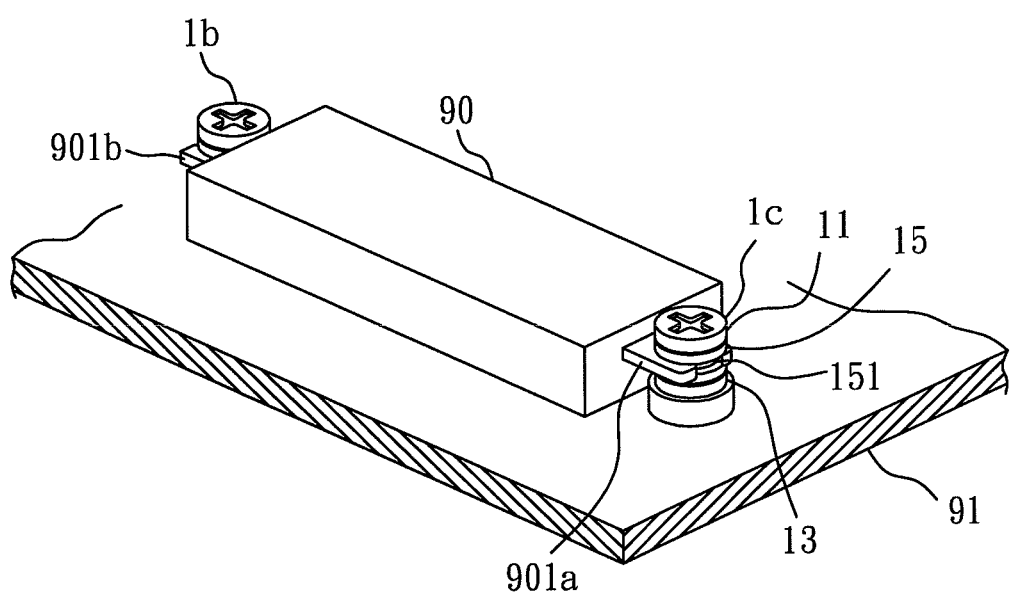
FIG. 4 illustrates a view of using the vibration-isolating screw to reduce an effect of the vibrations.

Please refer to FIG. 4 for a view of using the vibration-isolating screw to reduce an effect of the vibrations, as illustrated by the vibration-isolating screw 1 of FIG. 1. FIG. 4 illustrates how the vibration-isolating screw of the present invention is applied to reduce the effect of vibrations. It is noted that the vibration-isolating screw 1 is used only for illustration, and the present invention can use other type of vibration-isolating screws disclosed in the present invention to reduce the effect of vibrations.

In FIG. 4, two vibration-isolating screw 1b and 1c are used to fix a vibrating element 90 (which is a speaker in this embodiment, and can be any other element that can vibrate) on a main structure 91 (which is a computer case in this embodiment, and can be any other similar device) to reduce the effect of vibrations caused by the vibrating element 90 to the vibrating element 90. The vibration-isolating screw 1b and 1c can be connected with two collars 901a and 901b of the vibrating element 90 via a slot 151 of the third screw body 15, and the vibration-isolating screw 1b and 1c can be fixed to the main structure 91 via the thread 21. Since the slot 151 is on the third screw body 15, and the third screw body 15 is separated from the first screw body 11 and the second screw body 13 by the first gap 31 and the second gap 32 respectively, therefore, the vibration of vibrating element 90 has little effect on the first screw body 11 and the second screw body 13, let alone the main structure 91. Compared with the traditional method of using an ordinary screw or a screw with a anti-vibration pad, the vibration-isolating screw of the present invention can advantageously reduce the effect of vibration caused by the vibrating element to the main structure.

Figure 5:
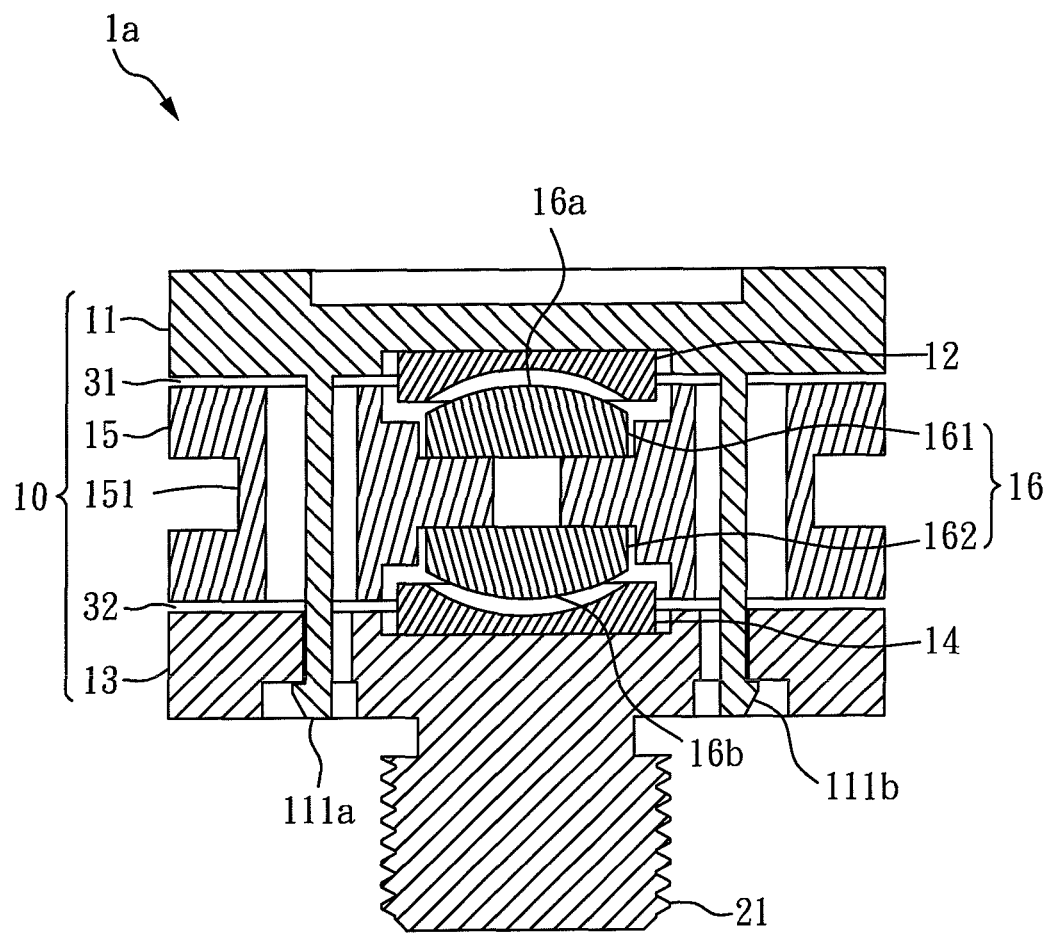
FIG. 5 illustrates a sectional view of a second embodiment of the vibration-isolating screw of the present invention.
Figure 6:
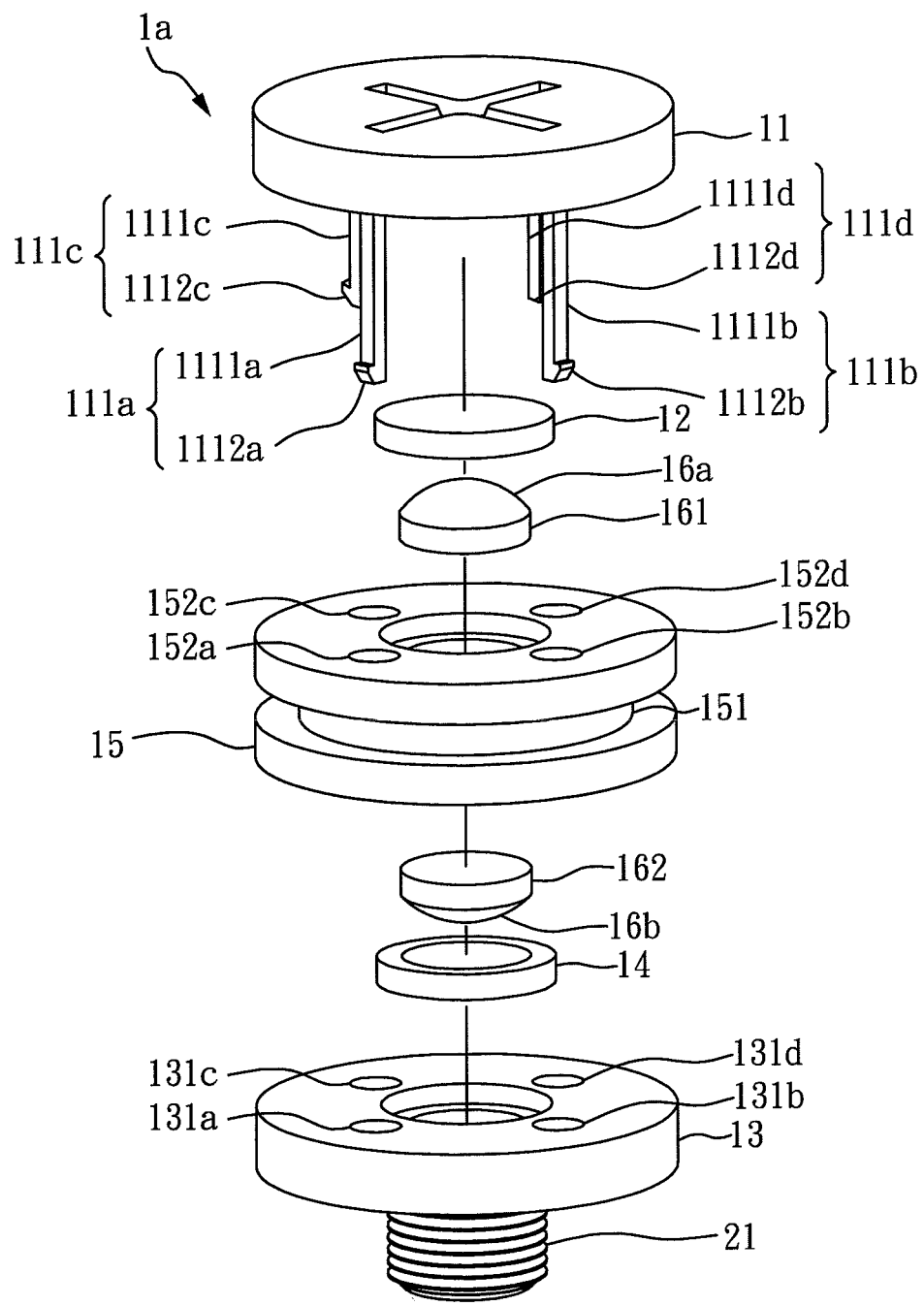
FIG. 6 illustrates an explosive view of the second embodiment of the vibration-isolating screw of the present invention.

Please refer to FIG. 5 and FIG. 6 for a second embodiment of the vibration-isolating screw of the present invention. In the second embodiment, a vibration-isolating screw 1a comprises the screw head 10 and the screw tail portion 20, wherein the screw head 10 comprises the first screw body 11, the first magnetic element 12, the second screw body 13, the second magnetic element 14, the third screw body 15, and the third magnetic element 16; the screw tail portion 20 comprises the thread 21.

In contrast to the first embodiment, the third magnetic element 16 of the second embodiment comprises an upper magnetic element 161 and a lower magnetic element 162, wherein the upper magnetic element 161 is disposed in the third screw body 15 and is adjacent to a side of the first screw body 11, the lower magnetic element 162 is disposed in the third screw body 15 and is adjacent to a side of the second screw body 13. The upper magnetic element 161 comprises a first end 16a which is adjacent to the first magnetic element 12 and is mutual repulsion; the lower magnetic element 162 comprises a second end 16b which is adjacent to the second magnetic element 14 and is mutual repulsion. Since the first magnetic element 12 and the upper magnetic element 161 are mutual repulsion, the second magnetic element 14 and the lower magnetic element 162 are mutual repulsion; therefore, the first gap 31 is formed between the first screw body 11 and the third screw body 15, and the second gap 32 is formed between the second screw body 13 and the third screw body 15.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A vibration-isolating screw for fixing a vibrating element on a main structure and reducing the vibration effect on the main structure caused by the vibrating element, the vibration-isolating screw comprising:
   a screw head comprising:
   a first screw body;
   a first magnetic element mounted on the first screw body;
   a second screw body;
   a second magnetic element mounted on the second screw body;
   a third screw body mounted between the first screw body and the second screw body, used for being connected with the vibrating element; and
   a third magnetic element mounted on the third screw body, wherein the third magnetic element comprises a first end and a second end, the first end and the first magnetic element are adjacent and mutual repulsion, the second end and the second magnetic element are adjacent and mutual repulsion; and
   a screw tail portion connected with the second screw body, used for fixing the vibrating element on the main structure, wherein the screw tail portion comprises a thread.

2. The vibration-isolating screw as claimed in claim 1, wherein the third screw body comprises a slot for allowing the third screw body to be connected with the vibrating element.

3. The vibration-isolating screw as claimed in claim 2, wherein the first screw body further comprises at least one hook, the second screw body further comprises at least one fixing hole, and the third screw body further comprises at least one through hole; the at least one hook is inserted through the at least one through hole and the at least one fixing hole to connect the first screw body, the second screw body and the third screw body.

4. The vibration-isolating screw as claimed in claim 3, wherein a first gap is formed between the first screw body and the third screw body, and a second gap is formed between the second screw body and the third screw body.

5. The vibration-isolating screw as claimed in claim 4, wherein the first magnetic element is mounted on the first screw body by gluing method, and the second magnetic element is mounted on the second screw body by gluing method.

6. The vibration-isolating screw as claimed in claim 5, wherein the first screw body, the second screw body and the third screw body are formed in a disk shape separately.

7. The vibration-isolating screw as claimed in claim 6, wherein the slot is a circular slot.

8. The vibration-isolating screw as claimed in claim 7, wherein the third magnetic element comprises an upper magnetic element and a lower magnetic element, the upper magnetic element is mounted in the third screw body adjacent to a side of the first screw body, and the lower magnetic element is mounted in the third screw body adjacent to a side of the second screw body.

9. The vibration-isolating screw as claimed in claim 3, wherein each one of the at least one hook comprises a slender portion and a hook portion, and the slender portion has a length longer than a thickness of the third screw body.

10. The vibration-isolating screw as claimed in claim 2, wherein the first screw body further comprises a plurality of hooks, the second screw body further comprises a plurality of fixing holes, and the third screw body further comprises a plurality of through holes; the plurality of hooks are inserted through the plurality of through holes and the plurality of fixing holes to connect the first screw body, the second screw body and the third screw body.

11. The vibration-isolating screw as claimed in claim 2, wherein the first screw body further comprises four hooks, the second screw body further comprises four fixing holes, and the third screw body further comprises four through holes; the four hooks are inserted through the four through holes and the four fixing holes to connect the first screw body, the second screw body, and the third screw body.

12. The vibration-isolating screw as claimed in claim 1, wherein a first gap is formed between the first screw body and the third screw body, and a second gap is formed between the second screw body and the third screw body.

* * * * *